(12) United States Patent
Sahni et al.

(10) Patent No.: US 7,523,218 B1
(45) Date of Patent: Apr. 21, 2009

(54) O(LOG N) DYNAMIC ROUTER TABLES FOR PREFIXES AND RANGES

(75) Inventors: Sartaj Kumar Sahni, Gainesville, FL (US); Haibin Lu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1174 days.

(21) Appl. No.: 10/426,423

(22) Filed: Apr. 30, 2003

Related U.S. Application Data

(60) Provisional application No. 60/376,853, filed on Apr. 30, 2002.

(51) Int. Cl.
*G06F 15/173* (2006.01)
(52) U.S. Cl. .................. 709/238; 709/239; 709/240; 709/241; 709/242; 709/243; 709/244
(58) Field of Classification Search ........................ None
See application file for complete search history.

(56) References Cited

U.S. PATENT DOCUMENTS

| | | | |
|---|---|---|---|
| 4,251,861 A | 2/1981 | Mago | |
| 4,833,468 A | 5/1989 | Larson et al. | |
| 5,546,390 A * | 8/1996 | Stone | 370/408 |
| 5,555,405 A | 9/1996 | Griesmer et al. | |
| 5,701,467 A | 12/1997 | Freeston | |
| 5,787,430 A | 7/1998 | Doeringer et al. | |
| 5,909,440 A | 6/1999 | Ferguson et al. | |
| 5,978,795 A * | 11/1999 | Poutanen et al. | 707/3 |
| 6,018,524 A | 1/2000 | Turner et al. | |
| 6,021,131 A | 2/2000 | Even | |
| 6,041,053 A | 3/2000 | Douceur et al. | |

(Continued)

OTHER PUBLICATIONS

Waldvogel et al. "Scalable High Speed IP Routing Lookups" Oct. 1997, ACM Computer Communication Review 27, p. 25-36.*

(Continued)

*Primary Examiner*—Kenny S Lin
*Assistant Examiner*—Angela Widhalm
(74) *Attorney, Agent, or Firm*—Saliwanchik, Lloyd & Saliwanchik

(57) ABSTRACT

An improved system and method is provided for packet routing in dynamic router tables. Specifically, the invention provides a method, computer system, and computer readable media for using Priority Search Trees (PSTs) to match, insert, and delete rules in dynamic routing tables in O(log n) time. In a first embodiment, for a dynamic router table consisting of n pairs of tuples, each tuple comprising an address prefix and next-hop information, the invention provides a system and method, using a PST, for inserting a new tuple, deleting an existing tuple, and searching for the tuple with the longest matching prefix for destination address, wherein each operation is performed in O(log n) time. In a second embodiment, for a dynamic router table consisting of n pairs of tuples, each tuple comprising a range of destination addresses and next-hop information, the invention provides a system and method, using a PST and a set of red-black priority search tree (RBPST), for inserting a new tuple, deleting an existing tuple, and searching for the tuple with the most specific matching range, wherein each operation is performed in O(log n) time. The invention can be implemented in numerous ways to improve dynamic router table performance, including as a system, a device, a method, or a computer readable medium.

12 Claims, 7 Drawing Sheets

U.S. PATENT DOCUMENTS

| | | | |
|---|---|---|---|
| 6,061,712 | A | 5/2000 | Tzeng |
| 6,092,072 | A | 7/2000 | Guha et al. |
| 6,104,701 | A * | 8/2000 | Avargues et al. ............ 370/238 |
| 6,157,955 | A | 12/2000 | Narad et al. |
| 6,212,184 | B1 | 4/2001 | Venkatachary et al. |
| 6,266,706 | B1 * | 7/2001 | Brodnik et al. ............ 709/242 |
| 6,289,013 | B1 | 9/2001 | Lakshman et al. |
| 6,335,932 | B2 | 1/2002 | Kadambi et al. |
| 6,341,130 | B1 | 1/2002 | Lakshman et al. |
| 6,553,370 | B1 * | 4/2003 | Andreev et al. ............... 707/3 |
| 6,581,106 | B1 * | 6/2003 | Crescenzi et al. ........... 709/242 |
| 6,681,218 | B1 * | 1/2004 | Zou ............................. 707/3 |
| 6,810,426 | B2 * | 10/2004 | Mysore et al. ............. 709/234 |
| 6,944,598 | B1 * | 9/2005 | Cline ......................... 705/28 |
| 6,963,924 | B1 * | 11/2005 | Huang et al. ................ 709/238 |
| 6,980,555 | B2 * | 12/2005 | Mar ...................... 370/395.21 |
| 7,065,091 | B2 * | 6/2006 | Shoham et al. ........ 370/395.41 |
| 7,111,071 | B1 * | 9/2006 | Hooper ...................... 709/238 |
| 7,113,581 | B2 * | 9/2006 | Benedyk et al. ............ 379/219 |
| 2002/0009076 | A1 | 1/2002 | Engbersen et al. |
| 2003/0112809 | A1 * | 6/2003 | Bharali et al. ............... 370/400 |
| 2003/0123387 | A1 * | 7/2003 | Jackson ...................... 370/230 |

OTHER PUBLICATIONS

Berg, M. Krevald and J. Snoeyink (1995) "Two- and Three-dimensional Point Location in Rectangular Sub-divisions" *Journal of Algorithms*. vol. 18, No. 2, pp. 256-277.

Bremler-Barr, A et al. (Dec. 14, 1999) "Routing with a Clue" *ACM SIGCOMM*. pp. 203-214.

Chandranmenon, G. and Varghese, G. (1996) "Trading Packet Headers for Packet Processing" *IEEE Transactions on Networking*. vol. 4, No. 2, pp. 141-152.

Cheung and McCanne. (1999) "Optimal Routing Table Design for IP Address Lookups under Memory Constraints," *IEEE INFOCOM*. pp. 1437-1444.

Degermark, M. et al. "Small Forwarding Tables for Fast Routing Lookups" *ACM SIGCOMM Proceedings of the ACM SIGCOMM '97 Conference on Applications, technologies, architectures, and protocols for computer communication*. pp. 3-14.

Doeringer, W. et al. (1996) "Routing on Longest-matching Prefixes" *IEEE/ACM Transactions on Networking*. vol. 4, No. 1, pp. 86-97.

Ergun, F. et al. (2001) "A Dynamic Lookup Scheme for Bursty Access Patterns" *IEEE INFOCOM*. pp. 1-10.

Gupta, P. and N. McKeown. (2000) "Dynamic Algorithms with Worst-case Performance for Packet Classification." *IFIP Networking*. pp. 528-539.

Hari, A. et al. (2000) "Detecting and Resolving Packet Filter Conflicts" *IEEE INFOCOM*. pp. 1203-1212.

Lampson, B. et al. (1998) "IP Lookup using Multi-way and Multicolumn Search" *IEEE INFOCOM Transactions on Networking*. vol. 7, No. 3, pp. 324-334.

Macian, C. and R. Finthammer. (2001) "An Evaluation to the Key Design Criteria to Achieve High Update Rates in Packet Classifiers" *IEEE Network*. Nov./Dec., pp. 24-29.

Mcauley, A. and P. Francis.(1993) "Fast Routing Table Lookups Using CAMs" *IEEE INFOCOM*. vol. 3 Mar./Apr., pp. 1382-1391.

McCreight, E. (1985). "Priority Search Trees" *SIAM Jr. on Computing*. vol. 14, No. 1, pp. 257-276.

Newman, P. et al. (Jan. 1997) "IP Switching and Gigabit Routers" *IEEE Broadband Communications Magizine*. vol. 35, pp. 64-69.

S. Nilsson and G. Karlsson (1998) "Fast Address Look-up for Internet Routers" *Proceedings of IEEE Broadband Communications*.

Ruiz-Sanchez, M. et al. (2001) "Survey and Taxonomy of IP Address Lookup Algorithms" *IEEE Network*, Mar./Apr., vol. 15, No. 2, pp. 8-23.

S. Sahni and K. Kim. "Data Structures of IP Lookup with Bursty Access Patterns", www.cise.ufl.edu/~sahni.

S. Sahni and K. Kim. (2001) "Efficient Construction of Fixed-Stride Multibit Tries for IP Lookup" *Proceedings 8th IEEE Workshop on Future Trends of Distributed Computed Systems*. pp. 178-184.

S. Sahni and K. Kim. (2002) "Efficient Construction of Variable-Stride Multibit Tries for IP Lookup." *Proceedings IEEE Symposium on Applications and the Internet (SAINT)*. pp. 220-229.

S. Sahni and K. Kim. (2002) "O(log n) Dynamic Packet Routing." *7th IEEE Symposium on computers and communications*.

S. Sahni and K. Kim. H. Lu. (May 2002) "Data structures for one-dimensional packet classification using most-specific-rule matching." *International Symposium on Parallel Architectures, Algorithms, and Networks (ISPAN)*, pp. 3-14.

K. Sklower. (1991) "A tree-based routing table for Berkeley Unix." *Proceedings of 1991 Winter USENIX Conference*. pp. 93-99.

V. Srinivasan and G. Varghese. (1999) "Faster IP lookups using controlled prefix expansion." *ACM Transactions on Computer Systems*. vol. 17, issue 1, pp. 1-40.

Suri, S., G. Varghese, and P. Warkhede (2001) "Multiway range trees: Scalable IP lookup with fast updates." *Proceedings of Globecom '01*.

Waldvogel, Marcel et al. (1997) "Scalable High Speed IP Routing Lookups." *Proceedings of the ACM SIGCOMM '91 Conference on Applications, technologies, architectures, and protocols for computer communication*. pp. 25-36.

\* cited by examiner

O(LOG N) DYNAMIC ROUTER TABLES FOR PREFIXES AND RANGES

CROSS-REFERENCE TO RELATED APPLICATIONS

This application claims the benefit of U.S. Provisional application No. 60/376,853, filed Apr. 30, 2002.

GOVERNMENT SUPPORT

This invention was made in part with funding under a funding grant, No. CCR9912395, from the National Science Foundation. The government has certain rights in the invention.

COPYRIGHT NOTICE

A portion of the disclosure of this patent document, including the Appendix, contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates to packet routing in dynamic router tables. More specifically, the invention relates to a method, computer system, and computer readable media for matching, inserting, and deleting rules in dynamic routing tables in O(log n) time.

BACKGROUND ART

There are a variety of methods currently available for classifying and routing packets in communication systems. In particular, in Internet packet classification systems, rules tables are used to classify and route incoming packets. For each incoming packet, the best rule that matches the incoming data is selected, and the action corresponding to the matched rule is performed.

Typically, in one-dimensional packet classification, each rule is either a prefix or a range of data. The incoming data, usually the packet header data, is used to determine the destination address of the packet. The classification is performed in a dynamic router table having rule tables comprising an array of a fixed size collection of elements, or tuples. In a one-dimensional packet classification scheme, a tuple commonly comprises a rule or prefix, and a destination address. The classification scheme matches the appropriate header information to incoming data packets according to the rules. Once the information is matched to a rule, the router acts according to the matched rule by routing the data packet to the appropriate destination address, or next hop.

Substantial research has been done on one-dimensional classifiers in which each rule is a prefix. The length of a prefix is limited by the length W of the destination address (i.e., W=32 for IPv4 destination addresses and W=128 for IPv6 destination addresses). Where each rule is a prefix, the router table is referred to as a prefix router-table. In prefix router-tables, the best rule for matching a destination address is by matching the longest prefix to the destination address. Hence, prefix router-tables use what is commonly termed "longest-prefix matching" to classify (or lookup) packets.

TRIE data structures are used to build systems that can extract information in a computational complexity order of one. The TRIE data structure, whose nomenclature originates from the middle section of the word "retrieval," is based on two principles: a fixed set of indices and hierarchical indexing. A fixed set of indices is derived when data is indexed by, for example, numerical digits or by the alphabet. Thus, each index is an array of elements (i.e., in the case where data is indexed by the numerical digits 0-9, a 10-element array is derived) wherein each of the array's element can point to another array. The hierarchical indexing depends on the amount of data stored in the TRIE data structure. Each element of data is stored at the highest level of the hierarchy based on retrieval uniqueness. As greater amounts of data are loaded onto the data structure, data elements with decreased retrieval uniqueness are "pushed down" or indexed at a lower level of the hierarchy.

Several TRIE-based data structures for prefix router-tables have been proposed that can perform each of the dynamic router-table operations (lookup, insert, delete) in O(W) time. Others structures attempt to optimize lookup time and memory requirement through an expensive preprocessing step. These structures, while providing very fast lookup capability, have a prohibitive insert/delete time. Therefore, these structures are suitable only for static router-tables (i.e., tables into/from which no inserts and deletes take place).

For example, a scheme has been proposed that performs a binary search on hash tables organized by prefix length (Waldvogel et al., "Scalable high speed IP routing lookups," *ACM SIGCOMM*, 25-36 (1997)). This binary search scheme has an expected complexity of O(log W) for lookup. An alternative adaptation of binary search to longest-prefix matching was developed by Hari, et al., "Detecting and resolving packet filter conflicts," *IEEE INFOCOM* (2000). Under this adaptation, a lookup in a table that has n prefixes takes O(W+log n) time. Because these schemes require expensive pre-computation, they are not suitable for dynamic router-tables.

In "Multiway range trees: Scalable IP lookup with fast updates," *GLOBECOM* (2001), Suri et al., propose a B-tree data structure for dynamic router tables that provides finding of L M P(d) in O(log n) time. However, inserts/deletes take O(W log n) time. When W bits fit in O(1) words (as is the case for IPv4 and IPv6 prefixes) logical operations on W-bit vectors can be done in O(1) time each. In this case, the Suri et al. scheme takes O(W+log n) time for an update.

Additionally, a data structure has been developed called a collection of red-black trees (CRBT) that supports the three operations of a dynamic prefix-router table in O(log n) time each. It has been demonstrated that CRBT structure can easily be modified to extend the biased-skip-list structure of Ergun et al. ("A dynamic lookup scheme for bursty access patterns," *IEEE INFOCOM* (2001)) to obtain a biased-skip-list structure for dynamic prefix-router-tables. Using this modified based-skip-list structure, lookup, insert, and delete can each be done in O(log n) time. Like the original biased-skip list structure of Ergun et al., the modified CRBT structure adapts so as to perform lookups faster for bursty access patterns than for non-bursty patterns. The CRBT structure may also be adapted to obtain a collection of splay trees structures, which performs the three dynamic prefix-router-table operations in O(log n) amortized time and which adapts to provide faster lookups for bursty traffic.

A model has been developed for table-driven route lookup that casts the table design problem as an optimization problem within the model (Cheung and McCanne, "Optimal routing table design for IP address lookups under memory constraints," *IEEE INFOCOM* (1999)). The Cheung and McCanne model accounts for the memory hierarchy of modern computers and they optimize average performance rather than worst-case performance.

Hardware solutions that involve the use of content addressable memory as well as solutions that involve modifications to the Internet Protocol (i.e., the addition of information to each packet) have also been proposed.

In addition to prefix routing, range routing can also be used. In a range router-table, each rule is a range of destination addresses. Several criteria have been proposed to select the best rule that matches a given destination address—first matching-rule in table, highest-priority rule that matches the address, and so on. Two data structures have been developed for dynamic range-router-tables—heap on TRIE (HOT) and binary search tree on TRIE (BOT) (see Gupta and McKeown, "Dynamic algorithms with worst-case performance for packet classification," *IFIP Networking* (2000). Both of these data structures are for cases when the best-matching rule is the highest-priority rule that matches the given destination address. The HOT takes O(W) time for a lookup and O(W log n) time for an insert or delete. The BOT structure takes O(W log n) time for a lookup and O(W) time for an insert/delete. However it would be desirable to reduce these times as much as possible to efficiently route packets.

In addition to the above mentioned papers, a number of U.S. Patents and published applications address dynamic routing schemes including, but not limited to U.S. Pat. Nos.: 6,341,130; 6,335,932; 6,289,013; 6,212,184; 6,157,955; 6,092,072; 6,061,712; 6,041,053; 6,021,131; 6,018,524; 5,909,440; 5,787,430; 5,701,467; 5,555,405; 4,833,468; 4,251,861; and published patent application Ser. No. 2002/0009076. Unfortunately, these references do not disclose schemes that adequately reduce the time in routing packets.

Accordingly, there is a need in the art for a dynamic data table routing structure to provide more effective ways to classify and route data packets. Specifically, a data table routing structure is needed to provide a quicker and more memory efficient method to search, insert, and delete items in a dynamic router data table.

SUMMARY OF THE INVENTION

The present invention provides unique schemes that are simple and permit lookup, insert, and delete in O(log n) time for each function. As contemplated by the present invention, priority search trees are used to represent dynamic prefix-router-tables. In accordance with the present invention, the best matching-prefix for range router-tables is the most-specific matching prefix (i.e., the range analog of the longest-matching prefix).

In one embodiment, the dynamic range-router-tables of the present invention, in which no two ranges overlap, employ the most-specific range matching for efficient representation when using two priority-search trees. Using two-priority-search-tree representation, lookup, insert, and delete can be performed in O(log n) time for each function.

In another embodiment, the dynamic range-router tables of the present invention are augmented with a collection of red-black priority search trees to obtain a range-router-table representation for non-conflicting ranges that permit lookup, insert, and delete in O(log n) time for each function.

In view of the foregoing, it is an object of the present invention to provide an improved system and method for matching, inserting and deleting data in a dynamic router table.

It is a another object of this invention to provide a system and method for matching, inserting and deleting of data in a dynamic router table comprising address prefix rules by finding the longest matching prefix using priority search tress.

It is yet another object of this invention to provide a system and method for matching, inserting and deleting of data in a dynamic router table comprising address destination ranges by finding the most specific matching range using priority search trees and red black trees.

The advantages of the invention are numerous. One significant advantage of the invention is that it provides a more memory efficient data structure, allowing better system resource allocation. Compared to conventional methods, the invention also significantly reduces the time required to insert and delete tuples in a dynamic data table. Moreover, for nonintersecting ranges and conflict free ranges, the invention significantly reduces the time required to search, insert, and delete tuples in a dynamic router table. Furthermore, by implementing the current invention in dynamic routers, network congestion can be reduced, throughput of network traffic can be increased, router table updates can be performed in real time, and the number of lost packets can be reduced.

Other aspects and advantages of the invention will become apparent from the following detailed description taken in conjunction with the accompanying drawings, illustrating, by way of example, the principles of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DISCLOSURE OF THE INVENTION

Briefly, the current invention is used to provide an improved system and method for matching, inserting, and deleting data in a dynamic router table. In particular, for a dynamic route table consisting of n pairs of tuples of the form (p,a), where p is the address prefix and a is the next-hop information, a system and method are provided, using a priority search tree (PST) for inserting a new tuple, deleting an existing tuple, and searching for the tuple with the longest matching prefix for destination address. According to the system and method, each step of finding, inserting, and deleting is advantageously performed in O(log n) time.

As known in the art, prefixes are a selected number of most significant bits (MSBs) of an address used to match a range of destination addresses having at least the identical MSBs. Typically, longest prefix routing is used to determine the best next hop for a given destination address because the longest prefix provides the most reliable estimate of the actual destination address.

In addition, the invention provides an improved system and method for matching, inserting and deleting data in a dynamic router table consisting of n pairs of tuples of the form (r,a), where r is a range of destination addresses matched by the tuple, and a is the next-hop information. Specifically, the system and method uses a PST and a red black priority search tree (RBPST) for inserting a new tuple, deleting an existing tuple, and finding the tuple with the most specific matching range for the destination address. Notably, the method is capable of being performed in O(log n) time, and the insert and delete operations preserve the conflict free properties of the set of tuples. As known in the art, more specific range routing and conflict free range routing are preferable methods of routing because they provide more reliable estimates of the actual destination address.

I. Routing Using Prefixes

The present invention uses priority search trees to represent dynamic prefix-router tables to reduce the processing time required to search, insert, and delete tuples. In one embodiment, the present invention uses priority search trees to perform prefix routing, wherein the best-matching prefix is the most-specific matching prefix (the range analog of the longest-matching prefix).

To determine the most specific matching prefix, R is established as a set of ranges such that each range represents an address prefix, wherein no two ranges intersect. As a result, the set of ranges R, is conflict free.

Figure 1:
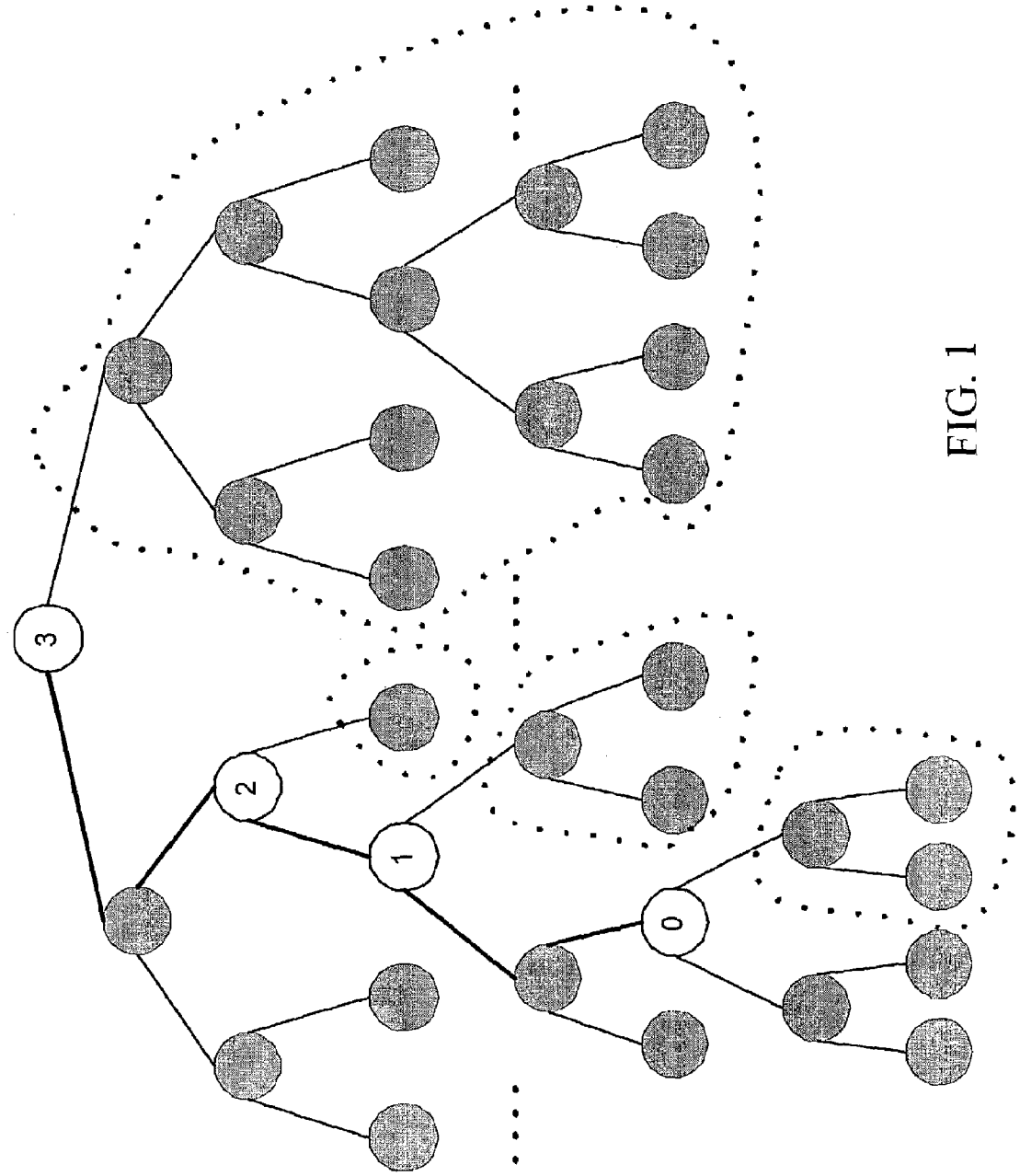
FIG. 1 illustrates an example of a red-black priority search tree (RBST) used in the present invention.
Figure 2:
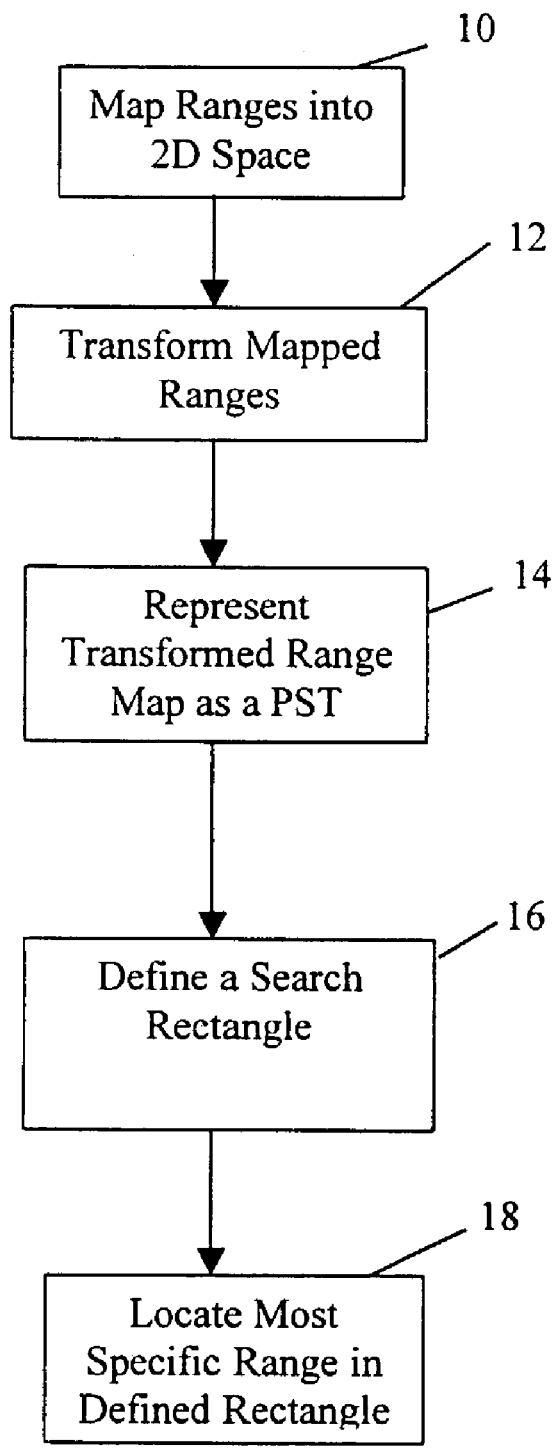
FIG. 2 is a flow chart illustrating the steps for finding most specific ranges according to the current invention.

As illustrated in the flow chart of FIG. 2, the most specific range is found by mapping the ranges in 2-dimensional space 10 and the map is transformed 12 so that no two points of the transformed map have the same x-value. Then, the transformed range map is represented as PST 14. By operating on the PST to define a rectangle 16 comprising the ranges associated with the desired destination address, the most specific range can then be found by locating the point in the defined rectangle 18 having the least x-value. Using this method, the longest prefix is located in the dynamic router table. To insert a prefix into the router data table, the range is mapped and transformed as described above, and the transformed range is inserted into the PST. To delete a prefix, the transformed range is removed from the PST. When the PST is an RBPST as shown in FIG. 1, each search, insert, and delete action is performed in O(log n) time.

The following examples explain how prefixes are routed in accordance with the present invention and as illustrated in FIG. 2.

EXAMPLE 1

Prefix Lookup

The set of ranges R, is conflict free and includes the range that corresponds to a prefix. With this assumption, the msr (d)—most specific range of R that matches destination address (d)—is defined for every destination address d (i.e., cannot equal zero) and is the conflict free range set defined as [maxStart(ranges(d)), minFinish(ranges(d))].

The set of ranges R is mapped in 2-dimensional space using the following equation:

(key1, key2, data)=(finish($R$), start($R$), data)

where (key1, key2, data) represent a set of tuples, where key1$\geq$0, key2$\geq$0, and no two tuples have the same key1 values, and where data is any information (i.e., next hop) associated with a range R. Thus, each range R is mapped to a point map1(R)=(key1,key2)=(finish(R), start(R)) in 2-dimensional space.

This map is transformed so that every x-value is unique. By performing the following operation transform1(P), no tow points (P) in the 2-dimensional map have the same x-value:

($x,y$)$\in$point set $P$.transform1($x,y$)=($x',y'$)=($2^W x-y+2^W-1,y$), and transform1($P$)={transform1($x,y$)($x,y$) $\in P$}; where W is the (maximum) number of bits in a destination address (i.e., W=32 in IPv4).

Therefore, $0 \leq x' < 2^{2W}$ for every ($x',y'$)$\in$transform1(P) enables no two points in transform1(P) to have the same x'-value.

To obtain the most specific range of R, a priority search tree (PST1) is applied to the transformed point set. For example, using a red-black priority-search tree (RBPST) where ranges (d) is given by the points that lie in a rectangle (including points on the boundary) defined by $x_{left}$=d, $x_{right}$=$\infty$, $y_{top}$=d, and $y_{bottom}$=0, these points are obtained using the enumerateRectangle($x_{left},x_{right},y_{top}$)=enumerateRectangle(d, $\infty$, d) of a data structure where $y_{bottom}$ is implicit and is always 0. Thus, by applying the enumerateRectangle($x_{left},x_{right},y_{top}$) operation, that being enumerateRectangle($2^W d-d+2^W-1,\infty,d$), the ranges(d) of the msr(d) are provided.

Then, the most specific range (prefix lookup routing) is determined by performing the operation minXinRectangle ($x_{left},x_{right},y_{top}$) on the ranges(d) provided.

EXAMPLE 2

Prefix Insertion

After performing the prefix lookup routing of Example 1, a prefix whose range in [u,v] is inserted by performing the operation transform1(map1([u,v]) in PST1. Where the prefix ([u,v]) is already in PST1, the next-hop information is updated for the prefix in PST1.

EXAMPLE 3

Prefix Deletion

In accordance with the present invention, a request to delete a prefix results in setting the next-hop associated with this prefix to zero. Thus, the deletion of a prefix does not delete the prefix from PST1.

II. Routing with Nonintersecting Ranges.

In an embodiment, the current invention addresses a most specific matching range for a given destination. In the case of nonintersecting ranges, the set of ranges R is conflict free. Assuming a range that matches all destination addresses exists in the set R, then a most specific range exists for every defined destination address. Therefore, the ranges can be mapped, transformed, represented on a PST, and operated on according to the steps described above (and shown in FIG. 2) for prefix routing to find the most specific range.

Insertion of a range is only permitted if the range to be inserted does not intersect any of the ranges R. If the range does not intersect, the steps for insertion described above for prefix routing can be used. To determine if the ranges intersect, two mappings are required. First, the ranges are mapped, transformed and represented on a first PST according to the procedure above and shown in FIG. 2. Then, the first PST is operated on to determine if there is an intersection with any of the other ranges. Second, the ranges are mapped, following the steps of FIG. 2, but using the second mapping, transforming, second PST creating, and second PST operating procedures such as those described in Example 4 below. If at least one of the two tests is positive, the ranges intersect. Deleting of a range requires deleting the range from both the first and second PSTs created, following the procedures outlined for matching prefixes described above. The complexity and resulting timing to find a most specific range, insert, and delete ranges is the same as for the set of ranges corresponding to matching prefixes.

EXAMPLE 4

New Range Verification and Routing

As noted above, insertion of new range r is permitted only if r does not intersect any of the ranges of R. Intersections of r in the ranges of R are present if r and s (wherein s=[x,y] in the ranges of R) have a non-empty intersection that is different from both r and s and is defined as $u<x\leq v<y \lor x<u\leq y<v$, where r=[u,v] is a pair of addresses u and v, $u\leq v$. The range r covers or matches all destination addresses d such that $u\leq d\leq v$.

This definition, $u<x\leq v<y \lor x<u\leq y<v$, illustrates the two cases in which the ranges intersect, when $u<x\leq v<y$ and when $x<u\leq y<v$. When map1(R) has at least one point in the rectangle defined by $x_{left}=u, x_{right}=v-1$, and $y_{top}=u-1$ and where $y_{bottom}=0$ by default, then the case of $x<u\leq y<v$ occurs. map1(R) is the point transformation as described in Example 1 above. A priority search tree (PST1) is then applied to the transformed point set. For example, using a red-black priority-search tree (RBPST) where ranges(d) is given by the points that lie in the rectangle defined above and performing the operation minXinRectangle($2^W u-(u-1)+2^W-1, 2^W(v-1, u-1)$) provides a most specific range. Should this most specific range exist in PST1, then the case of $x<u\leq y<v$ occurs.

To verify the occurrence of $u<x\leq v<y$, the ranges of R are mapped into 2-dimensional points (map2(R)) using the following equation:

$$map2(R)=(start(r), 2^W-1-finish(r))$$

where r=[u,v] and s=[x,y] as described above for map1(R). The range r represents the addresses {u,u+1, . . . ,v} and start(r)=u is the start point of the range and finish(r)=v is the finish point of the range. The range r covers or matches all destination addresses d such that $u\leq d\leq v$.

Intersections of r in the ranges of R can be present if map2(R) has at least one point in the rectangle defined by $x_{left}=u+1, x_{right}=v$, and $y_{top}=(2^W-1)-v-1$. By maintaining a second priority search tree (PST2) of points in transform2 (map2(R)), where transform2(x,y)=($2^W x+y,y$), the operation of the function minXinRectangle($2^W(u+1), 2^W v+(2^W-1)-v-1, (2^W-1)-v-1$) on the transform2(map2(R)) provides a most specific range. Should this most specific range exist in PST2, then the case of $u<x\leq v<$ occurs.

When $u<x\leq v<y$ and/or when $x<u\leq y<v$, then the administrator or user is notified that an intersection occurs and that the new range r cannot be inserted into the ranges of R. Further, according to the present invention, deleting new range r requires range r be removed from both PST1 and PST2 in a procedure similar to that provided in Example 2.

III. Conflict Free Ranges

By extending the two PST structure described for nonintersecting ranges described in the preceding section, the inventive method can be used for the general case when the range R is an arbitrary conflict free range set. For this embodiment, it is assumed that a range exists that matches all destination addresses. In addition, two PST trees are defined according to the procedures described for prefixes and nonintersecting ranges.

To find the most specific range, the first PST may be operated on as described in Example 1 above and in the Appendix. If the range to be inserted is a member of the set of ranges R, then the range can be inserted. If the range is not a member of the set of ranges R, then the range must inserted according to the dual PST method described above in Example 4 and must be checked for conflicts by computing the maximum and minimum projected range, as outlined in the Appendix and described below with respect to FIG. 3. Deletion of a range can occur if and only if the deletion range is not equal to the range that matches all destination addresses. If the deletation range is not equal to the range that matches all destination addresses, then the steps described in the Appendix are used to delete the deletion range from the conflict fee range set.

Figure 3:
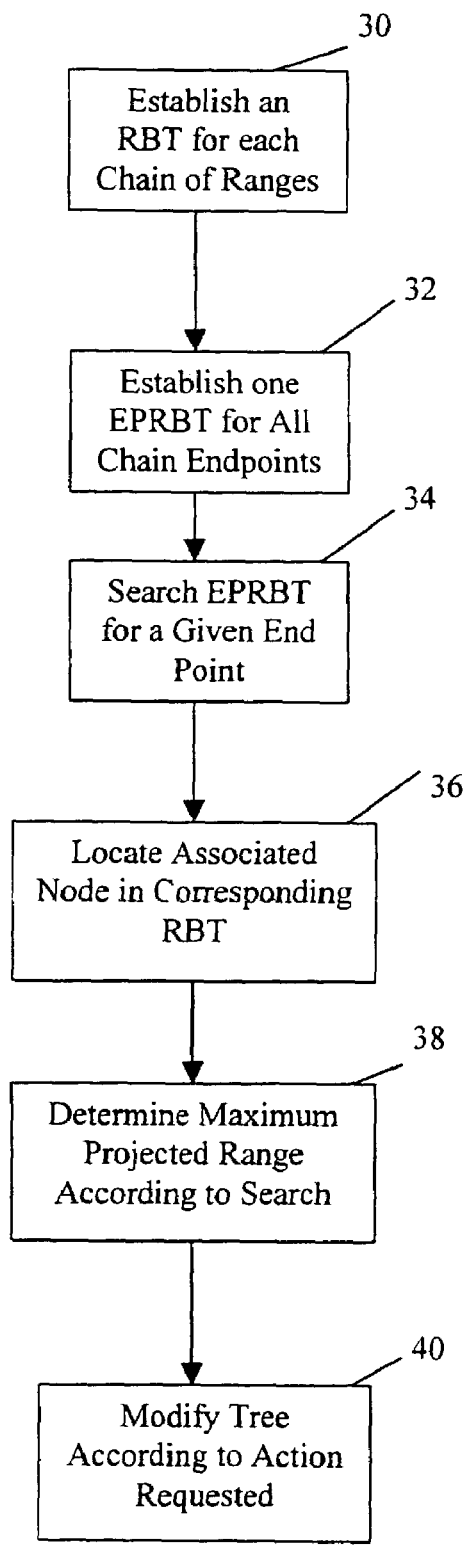
FIG. 3 is a flow chart illustrating the steps for computing maximum projected ranges according to the current invention.

In an embodiment, an efficient method of computing the maximum projected range for the deletion method for non-conflicting ranges is explained and shown in FIG. 3. Specifically, the method, as described in the Appendix, represents a normalized chain of ranges as an RBT 30, or alternatively, any balanced search tree structure that permits efficient join and split operations. The number of RBTs is equivalent to the number of normalized chains. Each RBT comprises a node for each range in the chain, the node having a range value, and four values to facilitate searching of the tree. In addition, the collection of RBTs is augmented by an additional end point red-black tree (EPRBT) 32 that represents the end points of the ranges in the set of normalized ranges. The EPRBT is used to store pointers corresponding to the associated node in each RBT. First, the EPRBT is searched for a given end point 34. If the given end point is found, then the EPRBT pointer is used to locate the associated node in the corresponding RBT 36. Thus, the node in the RBT having a given end point can be located.

As described in the Appendix, the maximum projected range can be found using the data associated with the node located in the RBT, which is represented by node 0 in FIG. 1. The RBT can then be searched to find the maximum projected range, if the search range exists, by performing a search through the appropriate RBT. Depending on the results of the search, the maximum projected range is determined 38.

Having created the two PSTs, a collection of RBTs and an EPRBT, these trees must be maintained for each insertion and deletion. Accordingly, the trees must be modified 40, in a manner described in the Appendix, whenever an insertion or deletion is performed.

The use of RBSTs for the above operations advantageously reduces the time required to perform searching, insertion, and deletion over conventional radix priority search tree (RPST) methods. Notably, the overall complexity of the invention using RBSTs is O(log n) for each operation, while the operation complexity using RPSTs is O(W) for searching and O(W+log n)=O(W) for insertion and deletion.

IV. Experimental Results

Figure 4:
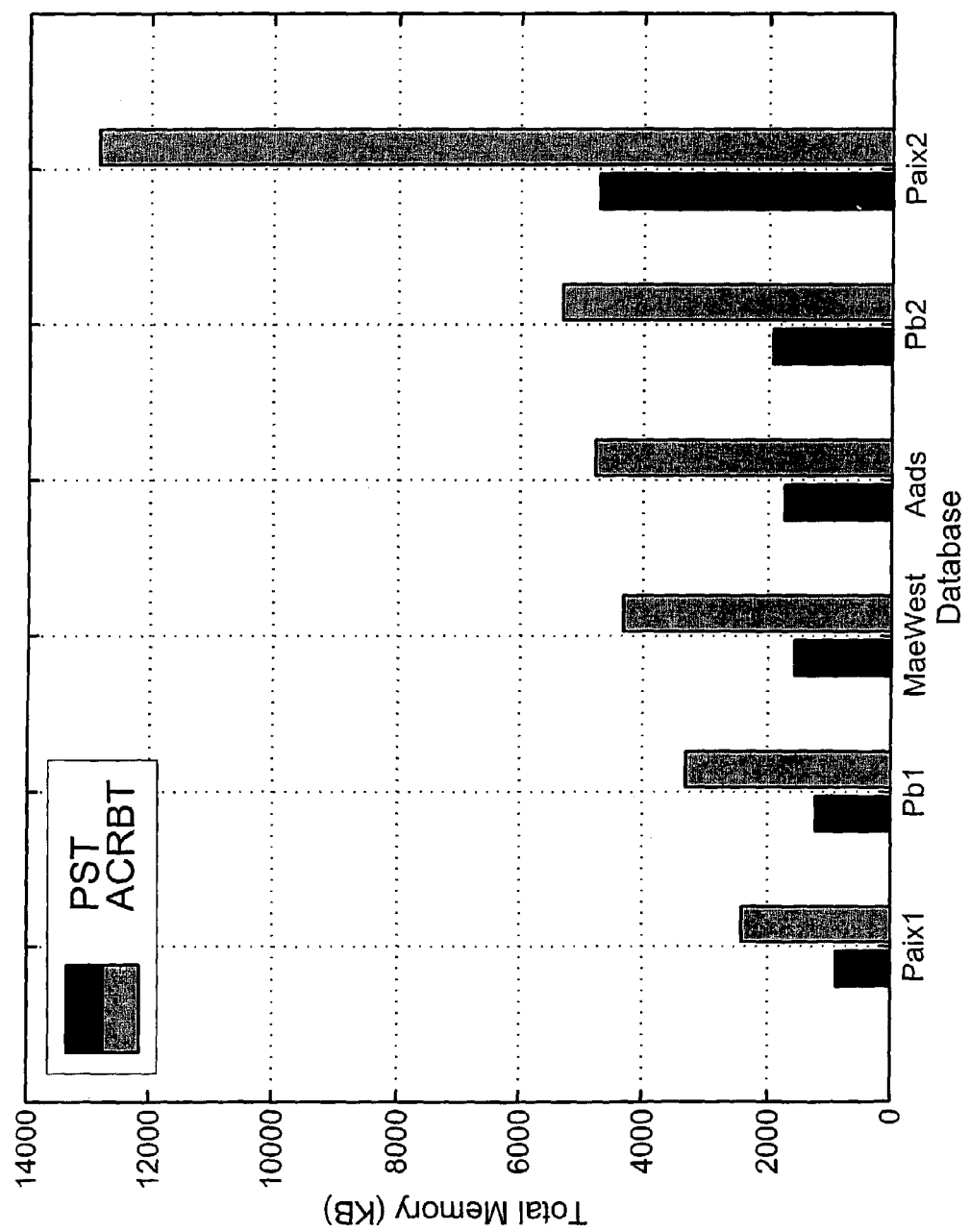
FIG. 4 is a graph illustrating the memory usage of a priority search tree (PST) of the current invention compared to a conventional ACBRT data structure.

In an embodiment, a 1.4 GHz Pentium 4 Personal Computer having 256 KB L2 cache is used. The preceding method for prefix matching using PSTs was incorporated into a C++ program running on the 1.4 GHz Pentium 4 PC and the resulting performance compared to a method using ACBRTs. For the test, databases of Internet Protocol, Version 4 (IPv4) packets, including Paix1, Pb1, MaeWest, Aads, Pb2, and Paix2, were used. Notably, as shown in FIG. 4, the memory requirements for the ACBRT structure was almost three times the memory requirement for the comparable priority search tree (PST) structure of the current invention.

Figure 5:
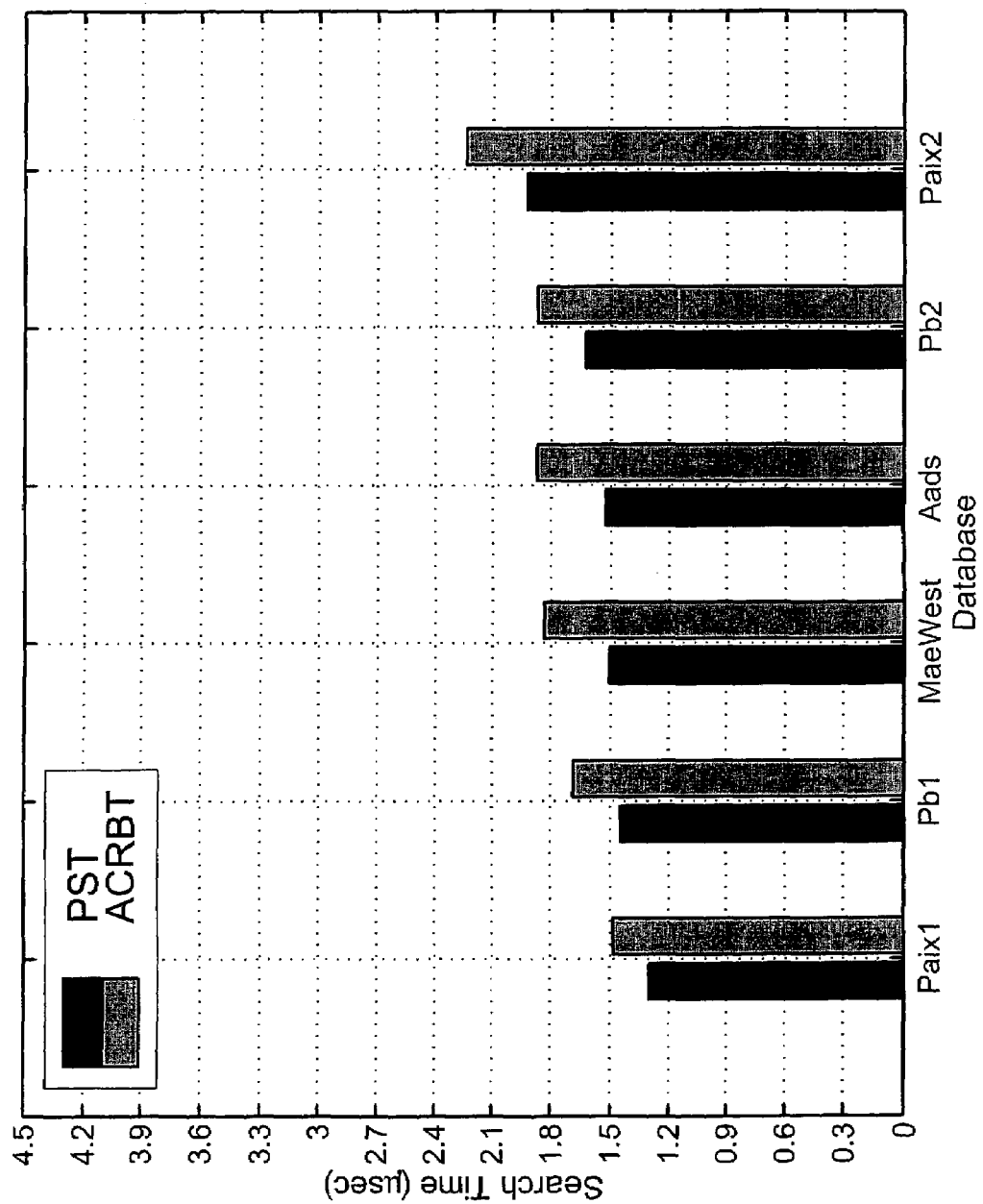
FIG. 5 is a graph illustrating the longest matching prefix time of a PST of the current invention compared to a conventional ACBRT data structure.

With respect to the performance speed, the mean time to find the longest matching prefix was analyzed. A PST and ACBRT containing all the prefixes of a prefix database were created. Next a random permutation of the set of start points of the ranges corresponding to the prefixes was obtained. The resulting permutation determined the order in which to search for the longest matching prefix for each of the start points. The time required to determine all of the longest matching prefixes was measured and averaged over the number of start points. The results of the comparison between the prefix matching times for the PST structure and the ACBRT structure are shown in FIG. 5. As can be seen in FIG. 5, prefix matching using an ACBRT took about 10% longer than using the PST of the present invention.

Figure 6:
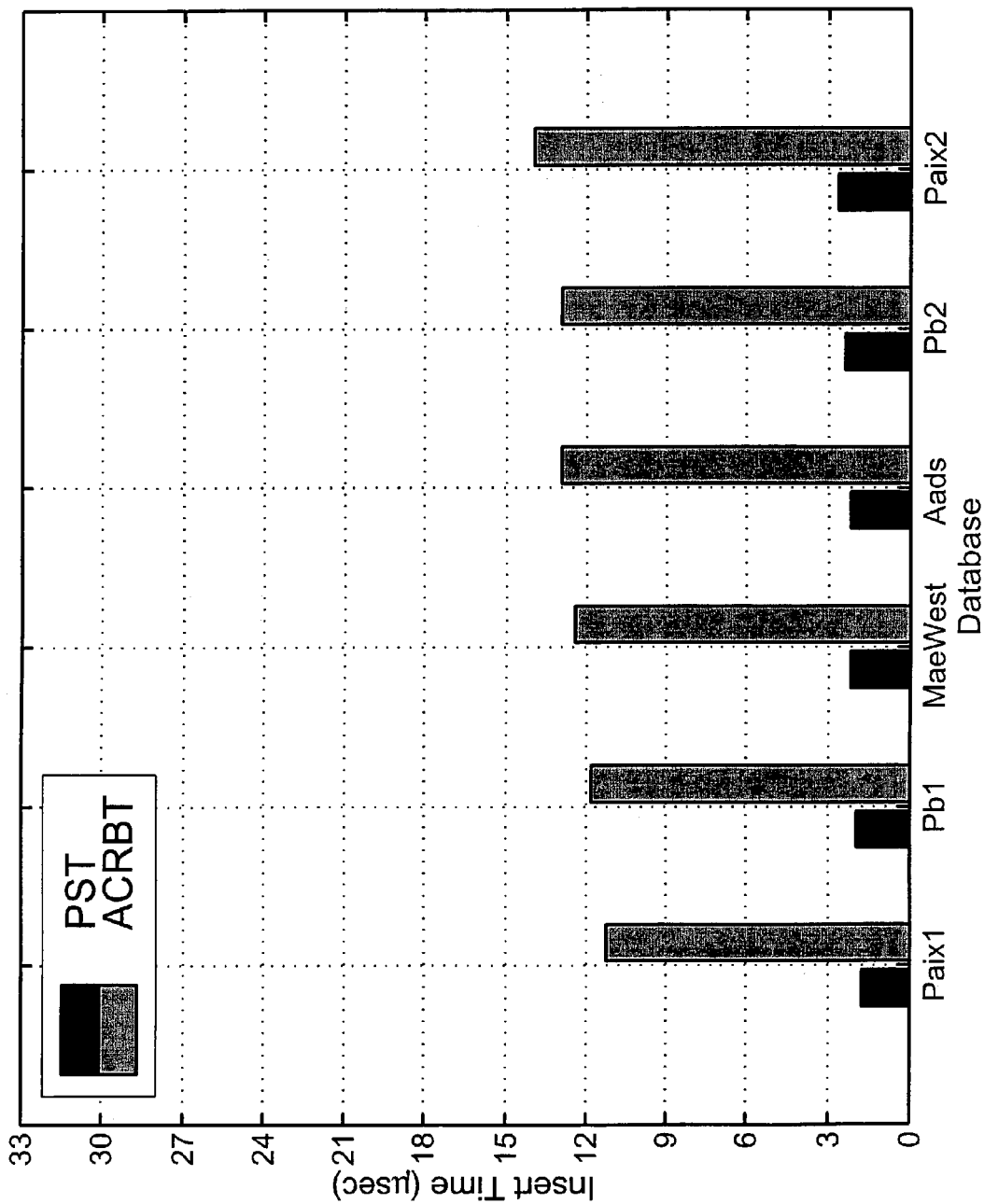
FIG. 6 is a graph illustrating the prefix insertion time of a PST of the current invention compared to a conventional ACBRT data structure.
Figure 7:
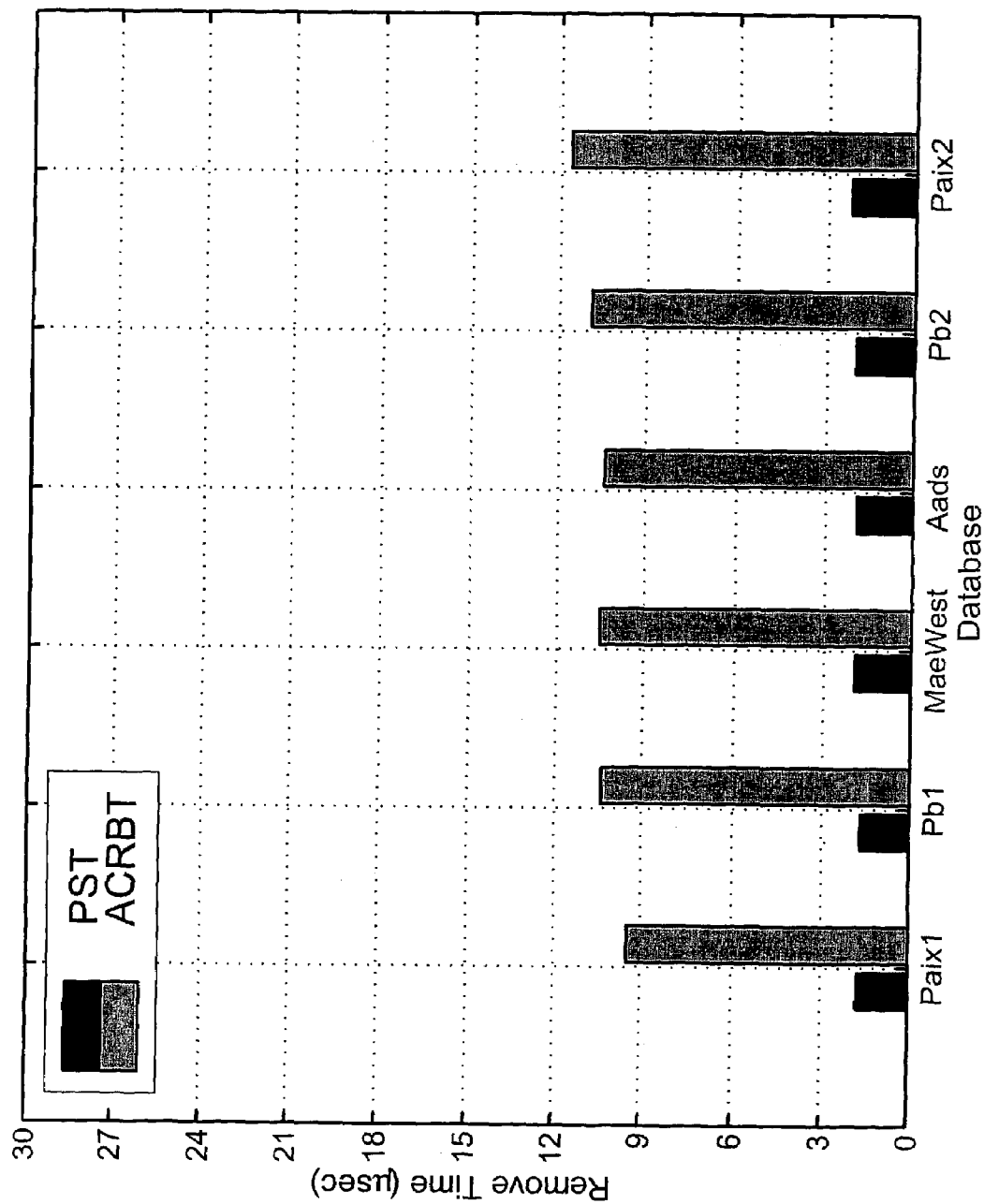
FIG. 7 is a graph illustrating the prefix deletion time of a PST of the current invention compared to a conventional ACBRT data structure.

Insertion and deletion times were also characterized and compared. To obtain the mean time to insert a prefix, a group of prefixes were randomly permuted and the first 67% of the prefixes were inserted into an initially empty data structure. Then, the time to insert the remaining 33% of the prefixes into the data structure was measured and the mean insertion time computed. The results in FIG. 6 show that insertion times for a PST structure were 20% of the insertion time required using an ACRBT structure. Finally, the deletion times between a PST and ACBRT structure were compared by measuring the time required to delete 33% of the prefixes from a data structure. The results, as shown in FIG. 7, show that deletion times for a PST structure were 20% of the deletion times required using an ACRBT structure.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, programmable logic device, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for matching, inserting, or deleting rules in dynamic routing tables in O(log n) time comprising applying at least one priority search tree to represent at least one dynamic routing table; mapping in 2-dimensional space a set of ranges R wherein each range represents a rule to provide at least one point set, transforming the map so that every point set on the map is unique; and representing the transformed map as a first priority search tree (PST1), wherein the point set comprises points x and y, and wherein the transformation of the point set is performed according to the following formulas: $(x,y) \in P.\text{transform1}(x,y)=(x',y')=(2^W x-y+2^W-1,y)$, and $\text{transform1}(P)=\{\text{transform1}(x,y)|(x,y) \in P\}$; wherein P is the point set and W is the number of bits in the destination.

2. A method for matching, inserting, or deleting rules in dynamic routing tables in O(log n) time comprising applying at least one priority search tree to represent at least one dynamic routing table; mapping in 2-dimensional space a set of ranges R wherein each range represents a rule to provide at least one point set, transforming the map so that every point set on the map is unique; and representing the transformed map as a first priority search tree (PST1), wherein the PST1 is a red-black priority-search tree (RBPST) that is performed according to the following formula: $\text{minXinRectangle}(x_{left}, x_{right}, y_{top})$, wherein $x_{left}, x_{right}, y_{top}$ are points that lie in a rectangle defined by $x_{left}=d, x_{right}=\infty, y_{top}=d$, said points are provided by performing the following formula: $\text{enumerateRectangle}(2^W d-d+2^W-1, \infty, d)$, wherein d is the destination and W is the number of bits in the destination.

3. A method for matching, inserting, or deleting rules in dynamic routing tables in O(log n) time comprising applying at least one priority search tree to represent at least one dynamic routing table; mapping in 2-dimensional space a set of ranges R wherein each range represents a rule to provide at least one point set, transforming the map so that every point set on the map is unique; representing the transformed map as a first priority search tree (PST1); and verifying if a new rule of range r intersects with any R, which comprises the steps of mapping a second point set of ranges R in 2-dimensional space by performing the following operation: $\text{map2}(R)=(\text{start}(r), 2^W-1-\text{finish}(r)$, transforming the map2(R), and representing the transformed map as a second priority search tree (PST2), wherein range r is a pair of addresses u and v where $\{u, u+1, \ldots, v\}$, $\text{start}(r)=u$ is the start point of the range r,finish(r)=v is the finish point of the range r, and the range r covers or matches all destination addresses d such that $u \leq d \leq v$.

4. The method according to claim 3, wherein the first point set of R is defined by $x_{left}=u$, $x_{right}=v-1$, and $y_{top}=u-1$; wherein the map of the first point set of R is transformed according to the following formula: $(x,y) \in P.transform1(x,y)= (x',y')=(2^W x-y+2^W-1,y)$, and $transform1(P)=\{transform1(x,y)|(x,y) \in P\}$ wherein P is the first point set and W is the number of bits in the destination, so that every first point set on the map is unique; and the transformed map is represented as the PST1.

5. The method according to claim 3, wherein the second point set of ranges R is defined by $x_{left}=u+1$, $x_{right}=v$, and $y_{top}=(2^W-1)-v-1$; wherein the map of the second point set of R is transformed according to the following formula: transform2(map2(R)), where $transform2(x,y)=(2^W x+y,y)$, and the transformed map is represented as PST2.

6. The method according to claim 5, wherein the PST2 is a red-black priority-search tree (RBPST) that is performed according to the following formula: minXinRectangle2($2^W(x_{left})$, $2^W(x_{right})|y_{top}$, $y_{top}$).

7. The method according to claim 3, further comprising the steps of verifying the PST1 and the PST2 of r does not intersect any ranges of R and inserting the new rule into the dynamic routing table.

8. The method of claim 3, further comprising the step of deleting a new rule of r comprising deleting r from both PST1 and PST2.

9. A method for matching, inserting, or deleting rules in dynamic routing tables in O(log n) time comprising applying at least one priority search tree to represent at least one dynamic routing table and inserting a range r into R, wherein the range R is an arbitrary conflict free range set; wherein at least two priority search trees are used to represent at least one dynamic routing table, wherein a first priority search tree is PST1 which is operated according to the following formula: minXinRectangle1($x_{left}$, $x_{right}$, $y_{top}$), wherein $x_{left}$, $x_{right}$, $y_{top}$ are points that lie in a rectangle defined by $x_{left}=d$, $x_{right}=\infty$, $y_{top}=d$, said points are provided by performing the following formula: enumerateRectangle($2^W d+2^W-1$, $\infty$, d), d is the destination, and W is the number of bits in the destination; and wherein a second priority search tree is PST2 which is operated according to the following formula: minXinRectangle2 ($2^W(x_{left})$, $2^W(x_{right})+y_{top}$, $y_{top}$).

10. The method according to claim 9, further comprising at least one normalized chain PST (RBPST) that is a red-black priority-search tree that represents a normalized chain of ranges, wherein the RBPST has a chain endpoint.

11. The method according to claim 10, further comprising at least one endpoint red-black priority search tree (EPRBT) that represents the chain endpoint of the RBPST.

12. The method according to claim 11, further comprising the step of searching the EPRBT to locate the associated RBPST.

* * * * *

UNITED STATES PATENT AND TRADEMARK OFFICE
CERTIFICATE OF CORRECTION

PATENT NO. : 7,523,218 B1
APPLICATION NO. : 10/426423
DATED : April 21, 2009
INVENTOR(S) : Sartaj Kumar Sahni and Haibin Lu It is certified that error appears in the above-identified patent and that said Letters Patent is hereby corrected as shown below:

Column 6,
Line 11, "values" should read --value--.
Line 16, "tow" should read --two--.
Line 19, "$(x,y) \in$ point" should read --$(x,y) \in$ point--.
Line 23, "$(x',y') \in$ transform1(P)" should read --$(x',y') \in transform1(P)$--.
Line 46, "transform1(map1([u,v]) in" should read --$transform1(map1([u,v]))$ into--.

Columns 8-9,
Lines 67-1, "operation complexity" should read --operational complexity--.

Column 10,
Line 35, "$(x,y) \in$ P.transform1(x,y)=(x',y')=($2^W$x-y+$2^W$-1,y)," should read
--$(x,y) \in P.transform1(x,y) = (x',y') = (2^W x-y+2^W-1,y)$,--.

Column 11,
Lines 7-8, "$(x,y) \in$ P.transform1(x,y)= (x',y')=($2^W$x-y+$2^W$-1,y)," should read
--$(x,y) \in P.transform1(x,y) = (x',y') = (2^W x-y+2^W-1,y)$,--.
Lines 21-22, "minXinRectangle2($2^W(x_{left})$, $2^W(x_{right})|y_{top}, y_{top})$" should read
--$minXinRectangle2(2^W(x_{left}), 2^W(x_{right})+y_{top}, y_{top})$--.

Column 12,
Line 12, "enumerateRectangle($2^W$d d+$2^W$-1, ∞, d)" should read
--$enumerateRectangle(2^W d - d + 2^W - 1, \infty, d)$--.

Signed and Sealed this

Twenty-ninth Day of September, 2009

David J. Kappos
*Director of the United States Patent and Trademark Office*